April 13, 1943.   T. R. HARRISON   2,316,240
CONTROL APPARATUS
Filed Oct. 31, 1941   3 Sheets-Sheet 1

INVENTOR
THOMAS R. HARRISON
BY
ATTORNEY

April 13, 1943.    T. R. HARRISON    2,316,240
CONTROL APPARATUS
Filed Oct. 31, 1941    3 Sheets-Sheet 2

INVENTOR
THOMAS R. HARRISON
BY *C.B.Spangenberg*
ATTORNEY

April 13, 1943.　　T. R. HARRISON　　2,316,240
CONTROL APPARATUS
Filed Oct. 31, 1941　　3 Sheets-Sheet 3

INVENTOR
THOMAS R. HARRISON
BY
ATTORNEY

Patented Apr. 13, 1943

2,316,240

UNITED STATES PATENT OFFICE 2,316,240

CONTROL APPARATUS

Thomas R. Harrison, Wyncote, Pa., assignor to The Brown Instrument Company, Philadelphia, Pa., a corporation of Pennsylvania Application October 31, 1941, Serial No. 417,303

19 Claims. (Cl. 171—95)

The present invention relates to control apparatus and more particularly to electrical control apparatus embodying means, auxiliary to the basic apparatus needed to control a variable condition, to anticipate the need for a correction before the condition under control has passed the control point to the end that unstable control or "hunting" is eliminated, or at least minimized.

An object of the invention is to obtain such regulation with control apparatus utilizing a thermocouple as the condition responsive element.

Another object of the invention is to provide such control apparatus wherein the auxiliary or anticipating means are physically stationary.

A further object of the present invention is to provide such control apparatus wherein the auxiliary means comprise suitably connected electrical resistance and reactance means which are adapted to displace the control point of the condition being controlled through a small range and in a sense to meet the changing trend of the condition and thus effect a corrective adjustment before the true control point is reached following a departure of said condition from said true control point.

Still another object of the present invention is to provide control apparatus adapted to effect such operation in a manner to avoid "drift" of the control point, which, for example, tends to be produced by changes in load in a furnace.

Another specific object of the present invention is to provide such control apparatus wherein the auxiliary or anticipating means referred to may be readily adjusted to the characteristics of the condition under control.

The present invention is particularly applicable to the control of any quantity or magnitude that is sluggishly responsive to changes in the medium or agent tending to produce and maintain the quantity. The regulation of the temperature in a furnace is an example of a control application in which such a condition is encountered. Because of structural requirements in furnaces there is usually a zone where the heat is applied and a separate and physically displaced zone where the work to be treated is placed. As a result of such physical displacement of the heating and working zones in the furnace, a lag or time delay occurs between the time of application of heat to the heating zone and the transfer of that heat to the working zone. Since it is ordinarily desired to control the temperature at the working zone, the temperature responsive element is usually positioned in this zone and the supply of heat producing agent to the heating zone is controlled thereby. Such control provisions leave much to be desired from the standpoint of good control, however, in that on a departure in the working zone temperature from the desired value, the lag referred to in the transfer of heat from the heating zone to the working zone tends to permit an undesired magnified variation in the supply of agent to the heating zone and, as a result, overshooting and consequent hunting of the working zone temperature about the control point. This effect is produced even though the supply of heat producing agent is cut off at the instant the working zone temperature reaches the control point because the energy stored in the heating zone will continue for some time after the supply of heat producing agent is cut off to supply the heat to raise the temperature of the working zone.

Various methods and apparatus arrangements have been employed in the prior art to reduce the extent and duration of departure of the working zone temperature from the desired value. For example, it has been proposed to control the temperature of the working zone by controlling the application of fuel to the heating zone in accordance with the temperature of the heating zone. It has also been proposed to control the temperature of the working zone by controlling the application of heat in accordance with the difference in temperature between the heating zone and the working zone. Such methods have not proven satisfactory, however, because the temperature in the working zone is dependent in part upon the thermal condition and capacity of the working zone, which factors in turn vary in accordance with the character of the work under treatment and the conditions of use are not constant factors but instead are variable and unpredictable, unpredictable at least with any degree of accuracy.

In accordance with the present invention auxiliary means are provided for modifying the operation of the primary control apparatus in accordance with the trend of the furnace working temperature variations to anticipate the need for a correction in the supply of agent to the heating zone before the working zone temperature has passed the desired control point whereby overshooting and hunting are avoided. In a specific embodiment of the invention a controlling pyrometer for regulating the operation of a fuel supply valve is operated in response to a current flow in a measuring circuit produced by a thermocouple which is subjected to the temperature it is desired to constantly maintain at a predetermined value. Also included in said measuring circuit are resistance and reactance means which operate to modify the effect on the controlling pyrometer of any changes in said thermoelectric current as required to effect a corrective adjustment of the fuel supply valve before the temperature has reached said predetermined value, that is, in anticipation of a need for such corrective adjustment.

The various features of novelty which characterize my invention are pointed out with particularity in the claims annexed to and forming part of this specification. For a better understanding of the invention, however, its advantages and specific objects obtained with its use, reference should be had to the accompanying drawings and descriptive matter in which I have illustrated preferred embodiments of the invention.

Figure 1:
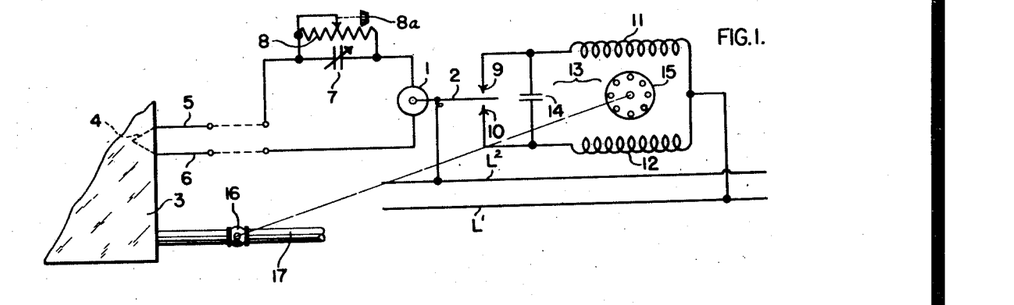
Fig. 1 is a control network diagram illustrating the use of my invention in a simple millivoltmeter control system utilizing a galvanometer.

The embodiment of my invention illustrated more or less diagrammatically in Fig. 1 comprises an electrical regulating device which is adapted to effect so-called "floating control" regulating operation and utilizes a measuring circuit of the simple millivoltmeter class. The regulating device includes a galvanometer 1 having a needle or pointer 2 which is adapted to be deflected in response to the variations in temperature within the work chamber of a furnace 3 as measured by a thermocouple 4 which is inserted in the work chamber and is connected by conducting leads 5 and 6 to the terminals of the galvanometer 1. As shown, a capacitance 7 having a resistance 8 connected in shunt therewith is included in the conductor 5. The function of the capacitance 7 and resistance 8 in the control device is explained in detail hereinafter.

The deflecting element or pointer 2 of galvanometer 1 is disposed in operative relation with a pair of stationary contacts 9 and 10 which are positioned on opposite sides of it and slightly displaced therefrom. The contacts 9 and 10 are connected to one end of a respective winding 11 and 12 of a two-phase reversible electrical motor 13, the other ends of which are connected together and to the conductor $L^1$ of an alternating current supply source. The other conductor $L^2$ of the supply source is connected to the galvanometer pointer 2 through a flexible connection as shown. A condenser 14 is connected between the contacts 9 and 10 and is provided to effect a phase shift of approximately 90° in the alternating current flow through one motor winding 11 or 12 with respect to that in the other winding when the pointer 2 is in engagement with one or the other of the contacts 10 or 9, respectively. The effect of such shift in phase of the energizing current in one motor winding with respect to that in the other is to produce a rotating field in the motor in one direction or the other and thereby rotation of the rotating element or rotor 15 of the motor in a corresponding direction. Thus, when the galvanometer pointer 2 is in engagement with the contact 9, the rotor 15 will rotate in one direction and when the pointer 2 is in engagement with the contact 10 the rotor will rotate in the opposite direction. Rotor 15 is connected through suitable gearing or other means to the operating stem of a valve 16 which is inserted in a fuel supply pipe 17 leading to the heating region of the furnace 3, and is adapted to vary the degree of opening of the valve and thereby the flow of fuel to the furnace.

As in the usual millivoltmeter controller, the current generated by the thermocouple 4 produces a deflection of the pointer 2 of the galvanometer against the opposing action of suitable spring means (not shown) within the galvanometer. When the current generated by the thermocouple falls below a value corresponding to the temperature for which the apparatus is preadjusted and at which the pointer 2 is out of engagement with both of the contacts 9 and 10, the pointer 2 deflects into engagement with the contact 10 and energizes the motor for rotation in the direction to effect an opening adjustment of the fuel supply valve 16 and thereby an increase in the supply of fuel to the furnace heating chamber. As the heat in the heating chamber is gradually transferred to the working chamber, the current generated by the thermocouple is increased and eventually that current is built up to a point at which the pointer 2 moves out of engagement with the contact 10. Limit switches (not shown) may desirably be provided in the motor energizing circuit to deenergize the motor in the event the fuel valve 16 is adjusted to one or the other of its extreme positions before the furnace working temperature has been returned to the desired value. Similarly, on an increase in temperature in the work chamber, the pointer 2 will deflect into engagement with the contact 9 and effect a closing adjustment of the valve 16 to return the work chamber temperature to the desired value.

Thus far, the operation of the arrangement of Fig. 1 has been described without reference to the novel auxiliary control provisions including condenser 7 and resistance 8 referred to hereinbefore. The tendency of these auxiliary control provisions is to temporarily modify the current supplied to the galvanometer from the thermocouple in response to any change in the working temperature of the furnace to simulate a condition different from that which actually exists in the work chamber upon departure of the working temperature from the desired value to the end that initially a large valve correction is produced, and in addition, a valve correction is produced in anticipation of the need for such correction.

Specifically, with the control apparatus stabilized and the working temperature of the furnace at the normal, desired value, the electromotive force developed by the thermocouple 4 will be divided between the galvanometer 1 and the parallel connected condenser 7 and resistance 8 in proportion to the relative resistances of the elements 1 and 8. In the case considered the component of electromotive force across the galvanometer 1 will be precisely that required to maintain the galvanometer pointer 2 out of engagement with the contacts 9 and 10, and as a result the motor 13 will be stationary with the fuel valve 16 adjusted to some position intermediate its limits of adjustment.

On a sudden departure of the temperature of the furnace work chamber from the desired control point, for example, on an increase in work chamber temperature, the electromotive force generated by the thermocouple 4 will increase to a corresponding extent. This increase in electromotive force is not immediately divided between the resistance 8 and the galvanometer 1, however, but instead the full change is momentarily applied to the galvanometer 1 because of the action of the capacitance 7 which tends to prevent any sudden changes in the potential across its terminals. The resulting deflection of the galvanometer pointer 2 into engagement with the contact 9 energizes the motor 13 for operation in the direction to decrease the supply of fuel to the furnace heating chamber as explained hereinbefore.

The capacitance 7 does not continue to hold its previous charge to maintain the potential across the resistance 8 at its original value, however, but gradually charges until the electromotive force developed by the thermocouple 4 is divided between the resistance 8 and galvanometer 1 in proportion to the relative resistances of these elements. With no further change in the furnace work temperature the potentials across the condenser 7 and galvanometer 1 will then be of greater magnitude by an amount corresponding to the extent of the temperature change than they were prior to the temperature change. Up to this point, therefore, the action of the control system is no different than it would be if the condenser 7 and resistance 8 were not employed, the only effect of condenser 7 and resistance 8 having been either to cause pointer 2 to travel beyond contact 9 or to cause greater pressure of contact between pointer 2 and contact 9 during the time the charge was changing on condenser 7.

When subsequently the furnace temperature begins to return toward the desired value, the electromotive force developed by the thermocouple 4 will begin to decrease to its original value. This decrease in electromotive force, as in the case of the increase of electromotive force considered above, is not immediately divided between the resistance 8 and the galvanometer 1, but is first assumed in its entirety by the galvanometer 1 because of the tendency of the condenser 7 to resist any change in potential across its terminals. The effect of this action is that the deflection of the galvanometer pointer 2 away from contact 9 and possibly on to contact 10, in response to the temperature change, is accelerated. That is to say, prior to the time when the electromotive force of the thermocouple 4 has decreased to the value corresponding to the desired furnace work temperature, the potential applied to galvanometer 1 will have been reduced to a value less than that required to maintain the pointer 2 in engagement with the contact 9 and may even decrease to such an extent that the pointer 2 will deflect into engagement with the contact 10. In the first case the motor 13 will be deenergized and thereby the adjustment of valve 16 stopped prior to the time the furnace work chamber temperature is returned to the desired value. In the second case, namely, the case when the pointer 2 is deflected into engagement with the contact 10, an energizing circuit will be closed to the motor 13 for effecting an opening adjustment of the fuel supply valve 16 before the furnace work temperature has reached the control point. In this case, therefore, a correction in the supply of heating agent is made in anticipation of the need for such correction. In both cases the operation required of the reversible motor 13 to restore the furnace work temperature to the desired value is anticipated, and as a result, the furnace work temperature is quickly restored to the desired value.

Such anticipation in the corrective adjustment of valve 16 will be effected upon a decrease in furnace work temperature following a sustained condition of the furnace work temperature at the desired value in a manner similar to that just described for a furnace work temperature increase.

It will be readily apparent, therefore, that by properly proportioning condenser 7 and resistor 8, the use of the auxiliary control provisions described will operate to reduce the departures from normal temperature, both in magnitude and frequency, and accordingly, more uniform working conditions will be maintained in the furnace. To this end the condenser 7 and resistance 8 are made adjustable in magnitude. As shown, the resistance 8 may be provided with a knob 8a which may be manipulated to vary the resistance.

As will be understood by those skilled in the art, the control point, or in other words the temperature it is desired to maintain in the furnace work chamber, may be adjusted by moving the contacts 9 and 10 relatively to the pointer 2 or by rotating the galvanometer supporting structure about the pivot point of the pointer 2. A suitable scale calibrated in terms of furnace work chamber temperature may desirably be provided in cooperative relation with the pointer 2 and contacts 9 and 10 for indicating the control point setting.

Figure 2:
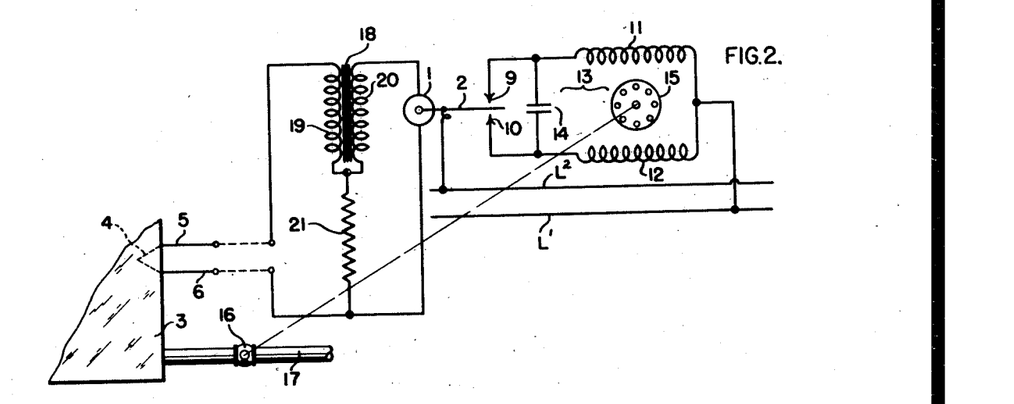
Fig. 2 is a view similar to Fig. 1 illustrating an alternative arrangement for obtaining the desired "anticipating" action.

In Fig. 2 I have illustrated, more or less diagrammatically, a modified form of the auxiliary control provisions employed in the arrangement of Fig. 1, in which modification an inductive reactance and associated resistance have been substituted for the capacitive reactance 7 and resistance 8 of Fig. 1. The said inductive reactance comprises a transformer 18 having a primary winding 19 and a secondary winding 20 connected in series relation and inserted in the conductor 5. The associated resistance referred to, and designated by the reference numeral 21 is connected between the point of engagement of windings 19 and 20 and the conductor 6. The resistance of the transformer windings 19 and 20 is negligible compared to the resistance of the resistance 21.

With this modified arrangement, when the furnace work temperature has been stabilized at the desired normal value for a considerable time, the potential applied to the terminals of the galvanometer 1 will be precisely that required to maintain the pointer 2 intermediate the contacts 9 and 10 and out of engagement with both of said contacts. It is noted that this electromotive force is substantially equal in magnitude to the potential drop maintained across the resistance 21 by the flow of thermocouple current. This is the case because the resistance of the transformer windings 19 and 20 is practically negligible compared to the resistance of resistance 21, and because the current flow through the primary winding 19 is then steady in value whereby the electromotive force induced in the secondary winding 20 is substantially zero in value.

On a departure in the furnace work chamber temperature from the desired value the electromotive force developed by thermocouple 4 will change accordingly to produce a corresponding change in current flow through the resistance 21 and the transformer primary winding 19. For example, on an increase in temperature, the current flow through resistance 21 and winding 19 will be changed in the increasing direction and will cause the induction of an electromotive force in the transformer secondary winding 20 which is additive to that produced across the resistance 21. The potential applied to the terminals of galvanometer 1 will thus be increased first by the increase in the potential drop produced across resistance 21 directly by the change in thermocouple current, and second by the component of electromotive force induced in the transformer secondary winding 20 as a result of the change in thermocouple current through the transformer primary winding 19. The consequent deflection of galvanometer pointer 2 into engagement with contact 9 energizes the motor 13 for rotation in the direction to decrease the supply of fuel to the furnace heating chamber.

The effect of the last mentioned component of electromotive force is to accentuate the deflection of the galvanometer pointer 2 in response to a furnace temperature change, that is, to maintain the galvanometer pointer 2 in engagement with contact 9 for a longer period than it would be maintained if the transformer 18 were dispensed with, and thereby to accentuate the correction of fuel valve 16 which is produced.

The component of electromotive impressed on the galvanometer 1 by the transformer 18 does not continue indefinitely, however, but gradually diminishes in value if there is no further change in the electromotive force produced by thermocouple 4. With no further change in the furnace work chamber, therefore, the potential impressed on the galvanometer 1 will then correspond to the potential drop across resistance 21 and will be of greater magnitude by an amount corresponding to the extent of the temperature change than it was prior to the temperature change.

As the furnace work chamber temperature gradually returns to the desired value, the electromotive force developed by the thermocouple 4 will begin to decrease to its original value and the change in current flow through transformer primary winding 19 will cause the induction of an electromotive force in the secondary winding 20 which is opposed to that produced across the resistance 21. The potential impressed on the terminals of the galvanometer 1 will, therefore be decreased in the first place by the decrease in the potential drop across resistance 21 caused by the reduced thermocouple electromotive force, and in the second place by the component of electromotive force induced in the transformer secondary winding 20 which is in opposition to the potential drop across resistance 21.

The effect of the component of electromotive force last referred to is that the deflection of the galvanometer pointer 2 away from contact 9, in response to the reduction in temperature in the furnace work chamber, is accelerated. Consequently, prior to the time when the electromotive force produced by the thermocouple 4 has decreased to the value corresponding to the desired furnace work temperature, the potential impressed on the galvanometer will have been reduced to a value less than that required to maintain the galvanometer pointer 2 in engagement with the contact 9 or even intermediate the contacts 9 and 10. Thus, the pointer 2 may deflect into engagement with the contact 10 to close an energizing circuit to the motor 13 for producing an opening adjustment of the fuel supply valve 16 before the furnace work temperature has reached the control point. That is to say, a correction in the supply of heating agent to the furnace is made in anticipation of the need for such correction in much the same manner as adjustment is made in the supply of heating agent to the furnace by means of the Fig. 1 arrangement utilizing a capacitive reactance in the conductor 5 instead of inductive reactance.

Such anticipation in the corrective adjustment of valve 16 will be made in a manner similar to that just described upon a decrease in the furnace work temperature from the desired value following a condition of stabilization at the desired value also. Accordingly, by properly designing transformer 18 and resistance 21 the use of the auxiliary control provisions disclosed in Fig. 2 operates to reduce the departures from the desired temperature, both in magnitude and frequency, and, therefore, more uniform working conditions will be maintained in the furnace.

Figure 3:
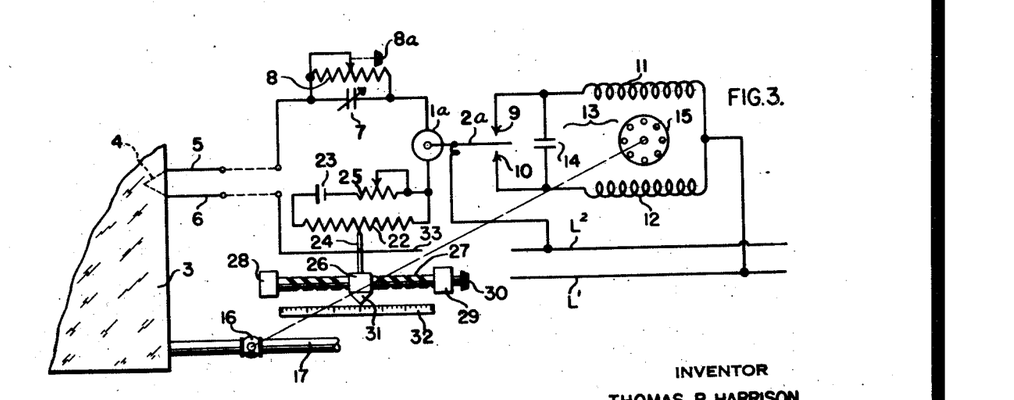
Fig. 3 is a further modification of the Fig. 1 arrangement illustrating the use of my invention in a deflectional type potentiometer system.

In Fig. 3 I have illustrated, more or less diagrammatically, a modification of the control arrangement disclosed in Fig. 1 wherein electrical provisions are made for adjusting the control point or varying the temperature of the furnace work chamber temperature. In addition, Fig. 3 illustrates the use of my invention in a deflectional type potentiometer system. The galvanometer 1a if Fig. 3 may be generally like the galvanometer 1 of Fig. 1 but is preferably so constructed as to permit deflection in one direction or the other from a mechanically zero or neutral position when an electromotive force of one polarity or the opposite is impressed across its terminals.

Specifically, in Fig. 3 a variable portion of an elongated potentiometer slidewire resistance 22, across which a suitable potential is adapted to be maintained by a battery 23, is adapted to be inserted into the conductor 6 by adjusting the position of a slidewire engaging contact 24 along the length of the slidewire 22. A rheostat 25 is provided in series with the battery 23 for adjusting the potential drop across the slidewire resistance to a suitable value. As shown, the slidewire contact 24 is carried by an internally threaded nut 26 which rides on a screw threaded shaft 27. The screw threaded shaft 27 is supported by bearings 28 and 29 provided at opposite ends thereof and is adapted to be rotated by manipulation of a knob 30 provided at the right end as seen in the drawings. An indicator 31 is also carried by the nut 26 and is disposed in cooperative relation with a suitably calibrated scale 32 for indicating the position to which the contact 24 is adjusted along the slide wire 22. The contact 24 is also maintained in engagement with a conductor 33 which is disposed closely adjacent the slidewire resistance 22. The conductor 33 is connected by the conductor 6 to one terminal of the thermocouple 4, and the right end of slidewire resistance 22 as seen in the drawings is connected to one terminal of the galvanometer 1. The polarity of battery 23 is such as to produce a potential drop across slidewire resistance 22 which opposes the electromotive force produced by thermocouple 4.

In accordance with the arrangement of Fig. 3 the control point, or in other words the value of temperature maintained in the furnace 3, is adjusted by manipulation of the knob 30. The scale 32, therefore, may desirably be calibrated in terms of temperature to be maintained in the furnace 3.

When the electromotive force generated by thermocouple 4 is substantially equal to the potential drop produced across that portion of slidewire resistance 22 between the right end thereof and contact 24, the current flow through resistance 8 and galvanometer 1a will be substantially zero. Upon departure of the temperature of the furnace work chamber from the desired value after the said temperature has been stabilized at the desired value for a considerable period, however, for example, upon an increase in that temperature, the electromotive force produced by the thermocouple 4 will increase and as a result overbalance the electromotive force derived from the slidewire resistance 22 and which is opposed to the thermocouple electromotive force. The differential electromotive force is not divided between the resistance 8 and the galvanometer 1a immediately but instead is initially impressed in its entirety upon the galvanometer 1a because of the tendency of the capacitance 7 to prevent any sudden changes in the potentials across its terminals. The consequent deflection of the galvanometer pointer 2a into engagement with the contact 9 energizes the motor 13 for rotation in the direction to decrease the supply of fuel to the furnace heating chamber.

The capacitance 7, as in the Fig. 1 arrangement, does not continue indefinitely to resist changes in potential across its terminals, however, but gradually charges until the electromotive force developed by the thermocouple 4 is divided between the resistance 8 and the galvanometer 1a in proportion to the relative resistances of these parts. With no further change in the furnace work temperature the potentials across the condenser 7 and galvanometer 1a will then be maintained at these values.

When thereafter the furnace work chamber temperature begins to return toward the desired value, the electromotive force developed by the thermocouple 4 will begin to decrease to its original value. This decrease in electromotive force is not immediately divided between the resistance 8 and the galvanometer 1a, but at first is assumed in full by the galvanometer 1a because of the tendency of the condenser 7 to resist any change in potential across its terminals. The immediate result of this operation is that the deflection of the galvanometer pointer 2a, in response to the furnace temperature decrease, is accentuated. Consequently, prior to the time when the electromotive force of the thermocouple 4 has decreased to the value corresponding to the desired furnace work chamber temperature, the electromotive force impressed on the terminals of the galvanometer 1a will have been reduced to zero and even reversed in polarity, the reversal in polarity being caused by the residual electromotive force maintained across condenser 7 and resistance 8. The pointer 2a will, therefore, be moved out of engagement with contact 9 and move into engagement with contact 10 to thereby establish and energizing circuit to motor 13 for effecting an opening adjustment of the fuel supply value 16 before the furnace work chamber temperature has decreased to the control point. Thus, a correction in the supply of heating agent to the furnace is made in anticipation of the need for such correction.

As in the arrangement of Figs. 1 and 2, such anticipation of the corrective adjustments of the valve 16 required will be effected upon a decrease in the furnace work chamber temperature following a condition of stabilization of the furnace work chamber temperature at the desired value in a manner similar to that just described for an increase in furnace work chamber temperature.

Figure 4:
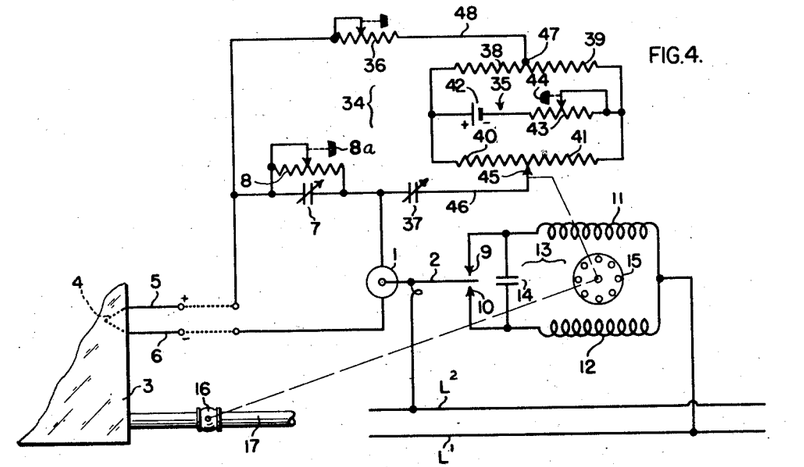
Figs. 4 and 5 are different modifications illustrating the use of my invention in proportioning type control systems including "reset" provisions.

In Fig. 4 I have illustrated a modification of the control system disclosed in Fig. 1 wherein an initially large corrective adjustment of valve 16 is first effected upon a change in the temperature in the furnace 3, thereafter the initial magnification is eliminated, or more specifically, the correction is reduced to a value which is proportional to the furnace temperature departure, and thereafter additional corrective adjustments, commonly termed reset adjustments, are made if the furnace temperature has not returned to the desired value within a predetermined time depending upon the constants of the furnace and the load therein. The arrangement of Fig. 4 operates also to anticipate a need for a fuel correction as in the arrangement of Fig. 1.

The additional control features attained in the arrangement of Fig. 4 and not obtained in the arrangement of Fig. 1 are obtained by means of a control circuit 34 which is connected in parallel to the capacitance 7 and resistance 8. The control circuit 34 comprises a Wheatstone bridge network 35, a resistance 36 and a capacitance 37. The Wheatstone bridge network 35 includes resistance legs 38, 39, 40 and 41 and is energized by a battery 42 through a rheostat 43 which is adjustable by means of a knob 44. The resistance legs 40 and 41 are desirably in the form of a slidewire resistance, as shown, and are engaged by a contact 45 which is slidable along the length of the slidewire resistance. The contact 45 has a rigid mechanical connection with the motor 13 and is adapted to be adjusted along the length of the slidewire resistance from one end to the other in accordance with the adjustments of the fuel valve 16 between its fully opened and fully closed positions.

The contact 45 is connected by means of a conductor 46, in which the capacitance 37 is connected, to the right end terminal of capacitance 7 and resistance 8, as seen in Fig. 4, and the point of engagement 47 of resistance legs 38 and 39 is connected by a conductor 48, in which the resistance 36 is connected, to the left end terminal of capacitance 7 and resistance 8. When the contact 45 is in engagement with the midpoint of the slidewire resistance composed of resistance legs 40 and 41, the potential of the contact 45 is the same as that of the bridge point 47. Upon movement of the contact 45 in one direction or the other from this midpoint on the slidewire resistance, however, a potential of one polarity or the other is produced between the contact 45 and bridge point 47. The magnitude of this potential for a given movement of the contact 45 along the slidewire resistance may be varied within limits by adjustment of the rheostat 43. Such a variation is known in the art as a throttling range adjustment.

The potential so derived between the contact 45 and bridge point 47 is impressed upon the series circuit including resistance 36, capacitance 7 and resistance 8 in parallel, and capacitance 37, and operates to cause a charging and discharging current to flow into and out of the capacitance 37 depending upon the polarity of the potential relatively to the charge which may already be present upon the capacitance 37. After a time interval depending upon the resistance of this series circuit and the capacity of the capacitance 37, the capacitance 37 will have as great a charge on it that it can possibly hold at the particular potential value impressed upon it and as a result, the flow of charging current in the series circuit to the capacitance 37 will cease. This condition, moreover, will prevail irrespective of the position of the contact 45 along the slidewire resistance. It is noted that the capacity of the capacitance 37 is large relatively to the capacity of capacitance 7. The capacity of capacitance 37 and the resistance of the series circuit is adjusted so as to correspond to the temperature lag within the furnace 3. To facilitate such adjustment the resistance 36 and capacitance 37 may desirably be made adjustable.

The operation of this embodiment of my invention will now be described. Upon variation of the furnace work chamber temperature from the desired value following stabilized operation of the control system with the contact 45 in the position shown, for example, upon an increase in furnace temperature from the desired value, the electromotive force produced by the thermocouple 4 will increase, and accordingly, the galvanometer pointer 2 will immediately deflect into engagement with the contact 9, substantially the full change in thermoelectric electromotive force being initially impressed on the galvanometer 1 as in the Fig. 1 arrangement. The motor 13 is then energized for rotation in the direction to effect a closing adjustment of the fuel valve 16 and simultaneously actuates the contact 45 to the left along the slidewire resistance as seen in the drawings. As the capacitance 7 charges the new value of thermoelectric electromotive force divides between the resistance 8 and the galvanometer 1 in proportion to their relative resistances whereby the electromotive force applied to the galvanometer 1 is reduced somewhat. The value of electromotive force applied to the galvanometer 1, however, is ordinarily sufficient to maintain the pointer 2 in engagement with contact 9 and therefore, if no other electromotive forces were impressed on the galvanometer circuit the pointer 2 would remain in engagement with the contact 9 until the temperature within the furnace work chamber begins to return to the desired value as in the Fig. 1 arrangement.

The adjustment of contact 45 to the left along the slidewire resistance, however, operates to impress an electromotive force on the series circuit referred to above which is of the proper polarity to cause a charging current to flow through resistances 36 and 8 as required to increase the potential drop across resistance 8 for the case under consideration, namely a furnace temperature increase. This charging current flows to the capacitance 37 and is effective to increase the potential drop across resistance 8 at a rate determined by the capacity of capacitance 7. The potential drop across resistance 8 and capacitance 7 thus produced approaches the value of electromotive force produced by the thermocouple 4, and since these potentials are in opposition to each other, the electromotive force applied to the galvanometer 1 decreases toward the value at which the contact 2 is intermediate the contacts 9 and 10 and will even become less than this value as the potential drop across resistance 8 approaches that of the thermoelectric potential. This causes the pointer 2 to separate from contact 9 and to move into engagement with contact 10 whereby the motor 13 is energized for rotation in the direction to give an opening adjustment to the fuel valve 16 and to actuate contact 45 to the right along the slidewire resistance. Such adjustment of the contact 45 results in a gradual reduction in the potential drop across resistance 8, and accordingly, the electromotive force applied to galvanometer 1 gradually falls off to the value required to maintain the contact 2 intermediate contacts 9 and 10, and when that state is reached the pointer 2 moves out of engagement with contact 10 toward a position intermediate the contacts 9 and 10. This causes deenergization of motor 13 for rotation.

Thus, the immediate effect of an increase in the furnace work chamber temperature from the desired value is an initially large closing adjustment of the fuel valve 16 followed thereafter by an opening adjustment of smaller magnitude than the closing adjustment. If the furnace work chamber temperature has then been restored to the desired value, the galvanometer 1 will remain in the position with contact 2 intermediate contacts 9 and 10 and the control system will be stabilized.

If the furnace work chamber temperature has not been restored to the desired value at this time, but starts to return and approaches that value before the flow of charging current to the condenser 37 ceases to flow, the electromotive force produced by the thermocouple 4 will begin to decrease to its original value. The full reduction in the thermoelectric electromotive force will be initially applied to the galvanometer 1 because of the action of condenser 7, and as a result, the galvanometer pointer 2 will be deflected into engagement with contact 10 to energize the motor 13 for operation in the direction to effect an opening adjustment of the fuel valve 16 in anticipation of the need for such a correction as in the arrangement of Fig. 1. The motor 13 will simultaneously actuate the contact 45 to the right along the slidewire resistance, and thus effect a reduction in the flow of charging current to the condenser 37. The potential drop produced across resistance 8 by the charging current flow therethrough will then be reduced at a rate depending upon the capacity of capacitance 7 which, as noted hereinbefore, tends to maintain the potential value existing thereon at any instant. It is noted that depending upon the extent of the adjustment of contact 45 along the slidewire resistance that a charging current may even be established through the resistance 8 in the reverse direction as a result of the capacitance 37 discharging to cause a further reduction in the potential drop across resistance 8.

The reduction in potential drop thus produced across the resistance 8 assists the reduction in potential drop produced thereacross as a result of the condenser 7 and resistance 8 finally assuming its share of the decrease in thermoelectric electromotive force and operates to cause the galvanometer pointer 2 to return to a position between the contacts 9 and 10 at substantially the same time that the thermoelectric electromotive returns to its original value corresponding to the desired furnace work chamber temperature.

In the case wherein the furnace work chamber temperature does not return to the desired value within a predetermined time, depending upon the capacity of capacitance 37 and the resistance of the series circuit including the bridge network 35 and resistances 8 and 36, the charge on the capacitance 37 approaches the maximum value which the capacitance 37 can hold for the particular value of applied electromotive force and as a result the flow of charging current to the capacitance 37 decreases toward zero. Consequently, the potential drop across resistance 8 falls off in value and the electromotive force applied to the galvanometer 1 is increased. The pointer 2 then moves into engagement with the contact 9 and completes an energizing circuit to the motor 13 to effect an additional fuel valve closing adjustment, and an additional adjustment of contact 45 toward the left along the slidewire resistance. This adjustment of the contact 45 causes a further flow of charging current through the resistance 8 to the capacitance 37 and thereby operates to effect a return movement of the galvanometer pointer 2 to a position between the contacts 9 and 10, and accordingly, to deenergize the motor 13 for rotation. Such additional fuel valve correcting adjustments and adjustments of the contact 45 along the slidewire resistance are produced until the fuel valve 16 and contact 45 have been adjusted to their extreme positions or until the temperature within the furnace work chamber has been reduced to the desired value.

Figure 5:
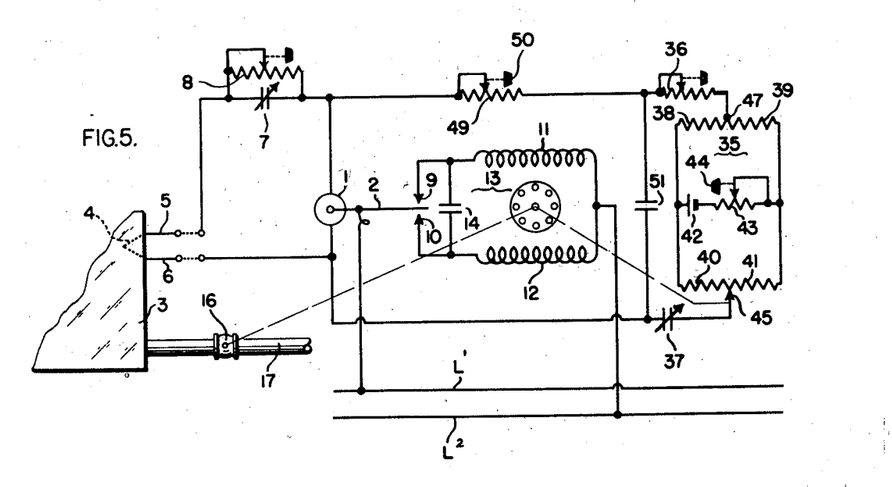

In Fig. 5 I have illustrated a modification of the control arrangement disclosed in Fig. 4. The control system of Fig. 5 includes a Wheatstone bridge network 35, a resistance 36 and a capacitance 37 all of which may be identical to the correspondingly identified parts of Fig. 4. In Fig. 5 the bridge network 35, resistance 36 and capacitance 37 are connected in a series circuit across the terminals of the galvanometer 1 instead of across the capacitance 7 and resistance 8 as in Fig. 4. A resistance 49 which is adjustable by means of a knob 50 is included in this series circuit. A capacitance 51 is connected in parallel with the galvanometer 1 and the resistance 49.

With this modification of my invention, when the furnace work chamber temperature has been stabilized at the desired value, the pointer 2 of the galvanometer 1 will be disposed between the contacts 9 and 10 out of engagement with both, and accordingly, the motor 13 will be deenergized. Upon variation in the furnace chamber from the desired value, for example, upon an increase in temperature the electromotive force developed by the thermocouple 4 will increase and substantially the full change in electromotive force will initially be impressed upon the terminals of the galvanometer 1 by virtue of the action of the condenser 7. The galvanometer 1 will then deflect the pointer 2 into engagement with the contact 9 to effect operation of the motor 13 in the direction to cause a closing adjustment of the fuel valve 16. Initial magnification in the adjustment of the fuel valve 16 in this arrangement is effected as a result of the operation of the resistance 49 and the condenser 51. It is noted that the increased electromotive force impressed on the galvanometer 1 as a result of the increased thermocouple electromotive force causes a flow of charging current through the resistance 49 into the condenser 51. When, subsequently the condenser 7 begins to assume its proper proportion of the electromotive force developed by the thermocouple 4 the potential drop across the galvanometer 1 will tend to decrease but when this happens the condenser 51 begins to discharge through the resistance 49 and the galvanometer 1. This action tends to maintain the galvanometer 1 with the pointer 2 in its deflected position in engagement with the contact 9. The deflection of the pointer 2 into engagement with the contact 9 therefore is prolonged and as a result causes a magnified adjustment of the fuel valve 16 to be made.

The motor 13 in addition to adjusting the fuel valve 16 also actuates the contact 45 along the length of the slidewire resistance composed of the resistances 40 and 41 an amount corresponding to the extent of the fuel valve adjustment. This adjustment of the contact 45 for the case under consideration is toward the right and results in the application to the condenser 51 of a potential of the proper polarity to cause the galvanometer 1 to deflect the pointer 2 out of engagement with the contact 9 and into engagement with the contact 10. The motor 13 is then energized for rotation in the opposite direction to effect a partial closing adjustment of the fuel valve and a partial return of the contact 45 towards its original position. This action continues until the potential impressed on the condenser 51 is the correct value to maintain the galvanometer pointer 2 between the contacts 9 and 10.

As long the furnace temperature is away from the desired control point, however, the control system is not stable because of the action of the condenser 37. The potential difference between the contact 45 and the bridge point 47 is divided between the condenser 51 and the condenser 37, the potential across the condenser 51 being determined mainly by the potential drop across the galvanometer 1. The difference between that potential drop and that between the contact 45 and the bridge point 47 is ultimately assumed by the condenser 37. When the condenser 37 has charged to its final potential, the potential across the condenser 51 will have increased to that potential which would be maintained across the galvanometer 1 if the circuit including resistance 49 and condenser 51 connected in parallel thereto were disconnected. This potential again causes the galvanometer 1 to deflect the pointer 2 into engagement with the contact 9 and thereby effects energization of the motor 13 for rotation in the proper direction to effect an additional fuel valve closing adjustment. The resetting adjustments of the control system of Fig. 5 are effected in this manner, the capacitance of the condenser 37 and the resistance of the resistance 36 being assigned values corresponding to the temperature lag encountered in the furnace 3.

As the furnace temperature begins to return to the desired value the electromotive force developed by the thermocouple 4 decreases and because of the action of the condenser 7 the full effect of this decreased electromotive force is immediately impressed on the galvanometer 1. This causes the galvanometer 1 to deflect into engagement with the contact 10 to effect energization of the motor 13 in the direction to cause a fuel valve opening adjustment. Such fuel valve opening adjustment is effected prior to the return of the furnace temperature to the desired value and therefore in anticipation of the need for such correction. In addition the control system operates in the manner described for case of a temperature decrease to effect an initial magnification in such fuel valve opening adjustment.

The overall effect of such operation is that the furnace temperature is quickly returned to the desired value upon deviation therefrom. Overshooting and hunting is reduced to a minimum.

Figure 6:
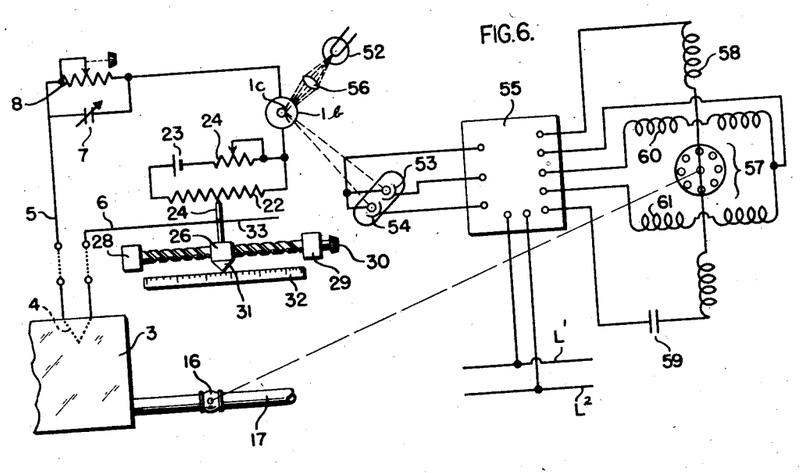
Figs. 6 and 7 illustrate an alternative arrangement for effecting the desired control operations in response to the deflections of the galvanometer.
Figure 7:
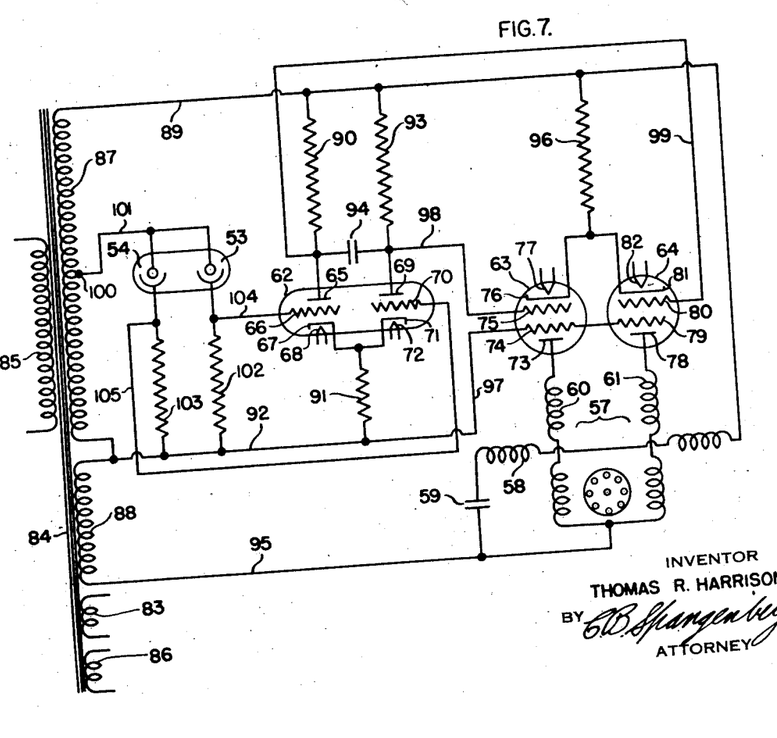

In Figs. 6 and 7 I have illustrated more or less diagrammatically an alternative arrangement for effecting the desired corrective adjustments of the fuel valve 16 in response to deflections of the sensitive element of the galvanometer. It will be understood that the arrangement disclosed in Figs. 6 and 7 may be utilized in connection with each of the control circuit arrangements disclosed in Figs. 1–5, if desired.

The control circuit arrangement shown in Fig. 6 is of the deflectional potentiometer type described in connection with Fig. 3 and its operation is the same as the control circuit arrangement of Fig. 3. In Fig. 6 the galvanometer is of the mirror type and has been designated by the reference character 1b. The sensitive element of the galvanometer 1b carries a mirror 1c which deflects in accordance with the electromotive force impressed upon the terminals of the galvanometer. This alternative arrangement also includes a relatively stationary source of light or lamp 52, a pair of photocells 53 and 54 which, as shown, may be housed within the same envelope and are connected to the terminals of an electronic amplifier 55. A lens 56 positioned between the lamp 52 and the galvanometer mirror 1c is also provided for focussing the reflected beam of light from the mirror 1c on the photocells.

When the furnace work chamber temperature is at the desired value and the control circuit arrangement is stabilized the mirror 1c of the galvanometer will be in its normal neutral position and the beam of light reflected by the mirror 1c will then shine equally on both photocells 53 and 54. When the galvanometer deflects in one direction, more light is reflected on one photocell 53 or 54 than on the other and upon reflection of the galvanometer in the opposite direction more light is reflected on the other photocell. The current passed by the photocells is amplified by the electronic amplifier 55 and the latter operates when one photocell receives more light than the other to selectively control the energization of a reversible electrical motor 57 for rotation in one direction or the other. The reversible electrical motor 57 is of the rotating field induction type and includes a winding 58 which is continuously energized from the alternating current supply lines L¹ and L² through a condenser 59, and also includes a pair of oppositely wound windings 60 and 61 which are adapted to be selectively energized by the amplifier 55 for controlling the direction of rotation of the motor.

One form of electronic amplifier 55 which may desirably be employed in the arrangement of Fig. 6 is disclosed in Fig. 7 and, as shown, includes electronic valves 62, 63 and 64. The electronic valve 62 is a twin triode and the electronic valves 63 and 64 are tetrodes. One triode of the valve 62 includes an anode 65, a control grid 66, a cathode 67 and a heater filament 68, and the other triode includes an anode 69, a control grid 70, a cathode 71 and a heater filament 72. The tetrode 63 includes an anode 73, a screen grid 74, a control grid 75, a cathode 76 and a heater filament 77. The tetrode 64 includes an anode 78, a screen grid 79, a control grid 80, a cathode 81, a heater filament 82.

Energizing current is supplied the heater filaments 68 and 72 of the electronic valve 62 from the low voltage secondary winding 83 of a combination step-up and step-down transformer 84 having a primary winding 85 and additional secondary windings 86, 87 and 88. The heater filaments 68 and 72 may desirably be connected in parallel to the transformer secondary winding 83. Energizing current is supplied the heater filaments 77 and 82 of the tetrodes 63 and 64, respectively, from the transformer secondary winding 86. The heater filaments 77 and 82 may desirably be connected in parallel to the winding 86.

Anode voltage is supplied the electronic valve 62 from the transformer secondary winding 87. The anode circuit of the triode including the anode 65 may be traced from the upper end of winding 87 through a conductor 89 to a resistance 90, anode 65, cathode 67, a biasing resistance 91 and a conductor 92 to the lower end of winding 87. Anode voltage is supplied the triode including the anode 69 through a circuit which may be traced from the upper end of winding 87 to conductor 89 to a resistance 93, anode 69, cathode 71, biasing resistance 91 and conductor 92 to the lower end of winding 87. As shown, a condenser 94 is connected between the anodes 65 and 69 of valve 62.

Anode voltage is supplied the tetrodes 63 and 64 from the transformer secondary windings 87 and 88 through a circuit including the opposed motor windings 60 and 61. Specifically, the anode circuit of tetrode 63 may be traced from the lower end of winding 88 through a conductor 95 to winding 60 of motor 57, anode 73, cathode 76, a biasing resistance 96, conductor 89 and the transformer secondary winding 87 to the upper end of winding 88. The anode circuit of tetrode 64 may be traced from the lower end of winding 88 through conductor 95 to motor winding 61, anode 78, cathode 81, biasing resistance 96, conductor 89 and the transformer secondary winding 87 to the upper end of winding 88. As shown the screen electrodes 74 and 79 of the tetrodes 63 and 64 respectively are connected by a conductor 97 to the point of connection of the transformer secondary windings 87 and 88. The input circuit of the tetrode 63 is controlled in accordance with the conductivity of the triode including the anode 69 and to this end the control electrode 75 is connected by a conductor 98 to the anode 69. Similarly, the input circuit of the tetrode 64 is controlled in accordance with the conductivity of the triode including the anode 65, the control electrode 80 being connected to the anode 65 by means of a conductor 99.

The input circuits of the triodes contained in the electronic valve 62 are controlled in accordance with the conductivity of the photoelectric cells 53 and 54 and thereby in accordance with the extent to which the latter are illuminated. The photoelectric cell 53 is energized by a portion of the transformer secondary winding 87 through a circuit which may be traced from a tap 100 on the winding 87 to a conductor 101, the anode of photocell 53, the cathode thereof, a resistance 102 and the conductor 92 to the lower end of the winding 87. The photocell 54 is energized through a circuit which may be traced from the tap 100 on the winding 87 through conductor 101 to the anode of photocell 54, the cathode thereof, a resistance 103 and the conductor 92 to the lower end of the winding 87. The point of engagement of the resistance 102 and the cathode of the photocell 53 is connected by a conductor 104 to the control electrode 66 and the point of engagement of the resistance 103 and the cathode of the photocell 54 is connected by the conductor 105 to the control electrode 70.

When both photocells 53 and 54 are equally conductive the potential impressed on the control electrode 66 will be the same as that impressed on the control electrode 70 and consequently the potential impressed on the control electrode 75 of valve 63 will be the same as the potential impressed on the control electrode 80 of the valve 64. Current of substantially the same magnitude will then flow in both of the motor windings 60 and 61 and accordingly the motor will not be energized for rotation in either direction but will remain stationary.

When the photocell 53 is illuminated to a greater extent than the photocell 54, however, the current flow through the resistance 102 will be greater than that through the resistance 103 and consequently the potential impressed on the control electrode 66 will be rendered less negative than that impressed on the control electrode 70. This will cause the triode including the anode 65 to become more conductive than the other triode, and accordingly, the potential drop across the resistance 90 is increased relatively to that across the resistance 93. The control electrode 80 is then rendered less negative with respect to the potential of the cathode 81 and as a result the current flow through the motor winding 61 is increased. At the same time the current flow through the motor winding 60 is decreased because the illumination of the photocell 54 is decreased when the illumination of the photocell 53 is increased. Thus, the potential of the control electrode 70 is rendered more negative with respect to the potential of the cathode 71 whereupon the potential of the control electrode 75 is rendered more negative with respect to the cathode 76 to effect a reduction in the conductivity of the tetrode 63. With the current flow through the motor winding 61 thus increased relatively to the current flow through the motor winding 60 the motor 57 will be energized for rotation in one direction or the other. Similarly, when the photocell 54 is illuminated to a greater extent than the photocell 53 the current flow through the motor winding 60 will be increased relatively to that through the motor winding 61 whereupon the motor 57 will be energized for rotation in the opposite direction.

While in the drawings and the foregoing description I have disclosed the use of the present invention in connection with thermocouple measuring systems, it will be understood that the invention is not to be construed as being limited to such use but if desired may be employed with other type measuring systems which are adapted to produce a variation in a direct current electromotive force upon change in the magnitude of a condition it is desired to control. For example, the present invention may advantageously be utilized in connection with Wheatstone bridge circuits. In such arrangements a temperature responsive resistance which is subjected to the temperature condition under control is ordinarily provided in one arm of the bridge circuit and operates to control the state of balance of the bridge circuit in accordance with the magnitude and the changes in magnitude of the temperature condition to thereby produce an unbalanced electromotive force of one polarity or of the opposite polarity between the bridge circuit output terminals. It is contemplated that this unbalanced direct current electromotive force may be connected to the conductors 5 and 6 of Figs. 1–6 in lieu of the thermocouple 4 for controlling the condition by means of the apparatus of the present invention.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent:

1. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, and auxiliary means to modify the effect of variations of the electromotive force produced by said first mentioned means on said device in accordance with the trend of the variations in said condition to anticipate the need for regulation of said condition.

2. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, and physically stationary means associated with said device to modify the effect of variations of the electromotive force produced by said first mentioned means on said device in accordance with the trend of the variations in said condition to anticipate the need for regulation of said condition.

3. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, and electrical reactance and resistance means associated with said device to modify the effect of variations of the electromotive force produced by said first mentioned means on said device in accordance with the trend of the variations in said condition to anticipate the need for regulation of said condition.

4. In a control system, a device having an element which is deflectable from a normal, neutral position, a thermocouple adapted to produce an electromotive force which is variable in accordance with the changes in a variable condition from a predetermined value, connections to impress said electromotive force on said device, means responsive to the deflections of said element to regulate said condition, and electrical reactance and resistance means connected in circuit with said thermocouple and said device to modify the effect of variations of the electromotive force produced by said thermocouple on said device in accordance with the trend of the variations in said condition to anticipate the need for regulation of said condition.

5. In a control system, a galvanometer having an element which is deflectable from a normal neutral position, a thermocouple adapted to produce an electromotive force which is variable in accordance with the changes in a variable condition from a predetermined value, connections to impress said electromotive force on said galvanometer, means responsive to the deflections of said element to regulate said condition, and electrical reactance and resistance means connected in circuit with said thermocouple and said galvanometer to modify the effect of variations of the electromotive force produced by said thermocouple on said galvanometer in accordance with the trend of the variations in said condition to anticipate the need for regulation of said condition.

6. In a control system, a device having an element which is deflectable from a normal, neutral position, a thermocouple adapted to produce an electromotive force which is variable in accordance with the changes in a variable condition from a predetermined value, connections to impress said electromotive force on said device, means responsive to the deflections of said element to regulate said condition, and electrical capacitance and resistance means connected in circuit with said thermocouple and said device to modify the effect of variations of the electromotive force produced by said thermocouple on said device in accordance with the trend of the variations in said condition to anticipate the need for regulation of said condition.

7. In a control system, a device having an element which is deflectable from a normal, neutral position, a thermocouple adapted to produce an electromotive force which is variable in accordance with the changes in a variable condition from a predetermined value, connections to impress said electromotive force on said device, means responsive to the deflections of said element to regulate said condition, and electrical inductance and resistance means connected in circuit with said thermocouple and said device to modify the effect of variations of the electromotive force produced by said thermocouple on said device in accordance with the trend of the variations in said condition to anticipate the need for regulation of said condition.

8. In a control system, a galvanometer having an element which is deflectable from a normal, neutral position, a thermocouple disposed in a region the temperature of which it is desired to maintain at a predetermined value, connections to impress the electromotive force produced by said thermocouple on said galvanometer, means responsive to the deflections of said element to regulate the supply of heating medium to the region in which said thermocouple is located, and auxiliary means to modify the effect of variations of the electromotive force produced by said thermocouple on said galvanometer in accordance with the trend of the temperature changes in said region to anticipate the need for correction in the supply of heating medium to said region.

9. In a control system, a device having an element which is deflectable from a normal, neutral position, means to produce an electromotive force which is variable in accordance with the changes in a variable condition from a predetermined value, connections to impress said electromotive force on said device, an adjustable source of electromotive force connected in circuit with said device and said means and opposed to said first mentioned electromotive force, means to adjust said adjustable source of electromotive force to vary the magnitude of the electromotive force opposed to said first mentioned electromotive force, means responsive to the deflections of said element to regulate said condition, and auxiliary means to modify the effect of variations of the electromotive force produced by said first mentioned means on said device in accordance with the trend of the variations in said condition to anticipate the need for regulation of said condition.

10. In a control system, a device having an element which is deflectable from a normal, neutral position, means to produce an electromotive force which is variable in accordance with the changes in a variable condition from a predetermined value, connections to impress said electromotive force on said device, means continuously out of physical contact with said element but responsive to the deflections thereof to regulate said condition, and auxiliary means to modify the effect of variations of the electromotive force produced by said first mentioned means on said device in accordance with the trend of the variations in said condition to anticipate the need for regulation of said condition.

11. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, auxiliary means to modify the effect of variations of the electromotive force produced by said first mentioned means on said device in accordance with the trend of the variations in said condition to anticipate the need for regulation of said condition, and follow-up means controlled by said responsive means to neutralize the effect on said device of variations in said electromotive force.

12. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, auxiliary means to modify the effect of variations of the electromotive force produced by said first mentioned means on said device in accordance with the trend of the variations in said condition to anticipate the need for regulation of said condition, and follow-up means adapted to be adjusted by said responsive means to neutralize the effect on said device of variations in said electromotive force including electrical bridge circuit means adapted to have an unbalanced electromotive force produced therein in accordance with the adjustment of said follow-up means and means to control said device by said unbalanced electromotive force.

13. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, auxiliary means to modify the effect of variations of the electromotive force produced by said first mentioned means on said device in accordance with the trend of the variations in said condition to anticipate the need for regulation of said condition, and follow-up means adapted to be adjusted by said responsive means to neutralize the effect on said device of variations in said electromotive force including electrical bridge circuit means adapted to have an unbalanced electromotive force produced therein in accordance with the adjustment of said follow-up means and connections to impress said unbalanced electromotive force on said device.

14. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, auxiliary means to modify the effect of variations of the electromotive force produced by said first mentioned means on said device in accordance with the trend of the variations in said condition to anticipate the need for regulation of said condition, follow-up means controlled by said responsive means to neutralize the effect on said device of variations in said electromotive force, and reset means associated with said follow-up means to dissipate the neutralizing effect of said follow-up means on said device.

15. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, auxiliary means to modify the effect of variations of the electromotive force produced by said first mentioned means on said device in accordance with the trend of the variations in said condition to anticipate the need for regulation of said condition, follow-up means adapted to be adjusted by said responsive means to neutralize the effect on said device of variations in said electromotive force including electrical bridge circuit means adapted to have an unbalanced electromotive force produced therein in accordance with the adjustment of said follow-up means and connections to impress said unbalanced electromotive force on said device, and reset means associated with said follow-up means to dissipate the neutralizing effect of said follow-up means on said device.

16. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, auxiliary means to modify the effect of variations of the electromotive force produced by said first mentioned means on said device in accordance with the trend of the variations in said condition to anticipate the need for regulation of said condition, follow-up means adapted to be adjusted by said responsive means to neutralize the effect on said device of variations in said electromotive force including electrical bridge circuit means adapted to have an unbalanced electromotive force produced therein in accordance with the adjustment of said follow-up means and connections to impress said unbalanced electromotive force on said device, and reset means associated with said follow-up means to dissipate the neutralizing effect of said follow-up means on said device, said reset means including electrical reactance included in said second mentioned connections.

17. In a control system, a device having an element which is deflectable from a normal, neutral position, means to produce an electromotive force which is variable in accordance with the changes in a variable condition from a predetermined value, connections to impress said electromotive force on said device, means responsive to the deflections of said element to regulate said condition, auxiliary means to modify the effect of variations of the electromotive force produced by said first mentioned means on said device in accordance with the trend of the variations in said condition to anticipate the need for regulation of said condition, follow-up means adapted to be adjusted by said responsive means to neutralize the effect on said device of variations in said electromotive force including electrical bridge circuit means adapted to have an unbalanced electromotive force produced therein in accordance with the adjustment of said follow-up means and connections to impress said unbalanced electromotive force on said device, and reset means associated with said follow-up means to dissipate the neutralizing effect of said follow-up means on said device, said reset means including electrical capacitance and resistance included in said second mentioned connections.

18. In a control system, a device actuable from a normal, neutral condition of operation, means to produce an electromotive force which is variable in accordance with the changes in a variable condition from a predetermined value, connections to impress said electromotive force on said device to actuate said device from said normal, neutral condition of operation, means responsive to changes in the condition of operation of said device to regulate said condition, and physically stationary means associated with said device to modify the effect of variations of the electromotive force produced by said first mentioned means on said device in accordance with the trend of the variations in said condition to anticipate the need for regulation of said condition.

19. In a control system, a device actuable from a normal, neutral condition of operation, a thermocouple adapted to produce an electromotive force which is variable in accordance with the changes in a variable condition from a predetermined value, connections to impress said electromotive force on said device to actuate said device from said normal, neutral condition of operation, means responsive to changes in the condition of operation of said device to regulate said condition, and electrical reactance and resistance means connected in circuit with said thermocouple and said device to modify the effect of variations of the electromotive force produced by said thermocouple on said device in accordance with the trend of the variations in said condition to anticipate the need for regulation of said condition.

THOMAS R. HARRISON